United States Patent
Waugh et al.

(10) Patent No.: US 7,356,388 B2
(45) Date of Patent: Apr. 8, 2008

(54) PREVENTION OF INTERFERENCE FROM MOVABLE RADIATION NETWORKS

(75) Inventors: Guy Waugh, County Kerry (IE); Michael Fitzgerald, County Kerry (IE); Christopher Young, Dublin (IE); Michael Godley, County Kerry (IE); Richard Lord, Cork (IE); John Walsh, County Kerry (IE); David Sharp, County Kerry (IE)

(73) Assignee: Slieve Mish Inventions Limited, Tralee. County Kerry (IE)

( * ) Notice: Subject to any disclaimer, the term of this patent is extended or adjusted under 35 U.S.C. 154(b) by 131 days.

(21) Appl. No.: 11/418,117

(22) Filed: May 5, 2006

(65) Prior Publication Data

US 2006/0206262 A1    Sep. 14, 2006

Related U.S. Application Data

(63) Continuation of application No. PCT/IE2004/000157, filed on Nov. 8, 2004.

(60) Provisional application No. 60/517,866, filed on Nov. 7, 2003.

(51) Int. Cl.
*G05D 1/00*     (2006.01)

(52) U.S. Cl. .................. 701/1; 701/36; 342/357.09; 342/357.13

(58) Field of Classification Search .............. 701/1, 701/36, 200–216; 342/357.02–357.17, 463, 342/464; 455/422.1, 431
See application file for complete search history.

(56) References Cited

U.S. PATENT DOCUMENTS

| 5,444,762 A | 8/1995 | Frey et al. |
| 6,269,243 B1 | 7/2001 | Corbefin et al. ............ 455/431 |
| 7,205,939 B2* | 4/2007 | Zimmerman ................ 342/464 |
| 7,271,766 B2* | 9/2007 | Zimmerman et al. ....... 342/464 |
| 2002/0045444 A1 | 4/2002 | Usher et al. ................ 455/422 |

FOREIGN PATENT DOCUMENTS

| WO | WO01/15338 | 3/2001 |
| WO | WO01/20719 | 3/2001 |
| WO | WO03/098861 | 11/2003 |

* cited by examiner

*Primary Examiner*—Richard M. Camby
(74) *Attorney, Agent, or Firm*—Jacobson Holman PLLC

(57) ABSTRACT

A radio interference avoidance system (1) has a processor in a detection system (11) which receives real time inputs from various sensors (12-16). The processor dynamically determines if a craft (for example, ship) movable network (19) is within an interference distance of a fixed network. It uses real time craft position data relative to fixed network position and also radiation characteristic data for both the movable (19) and fixed networks.

20 Claims, 2 Drawing Sheets

PREVENTION OF INTERFERENCE FROM MOVABLE RADIATION NETWORKS

This is a continuation of PCT/IE2004/000157 filed 8 Nov. 2004 and published in English, claiming the benefit of U.S. Provisional Application No. 60/517,866 filed 7 Nov. 2003.

INTRODUCTION

1. Field of the Invention

The invention relates to communication involving persons or devices on a movable vehicle or craft. either airborne. water-borne. or land-borne.

2. Prior Art Discussion

On-board cellular networks are becoming increasingly popular on craft such as ships and aircraft. These networks allow cellular phones to be used on board in the same way as they are used on conventional-land based cellular networks. An issue with these on-board networks is the possibility that they interfere with land based radio services or that the land based services interfere with the on-board network. It is also a requirement for on-board networks to be shut-down in circumstances where they may be perceived to take revenue generating traffic away from a licensed land based network.

U.S. Pat. No. 5,444,762 describes an approach to avoiding interference between aircraft and ground mobile networks in which aircraft directional antennae are used to minimise signal strength received by the ground network. WO01/15338 describes an approach to avoiding interference between a ship's base transceiver station (BTS) and a fixed BTS. Little detail is given, however, it appears that the system detects signals from the fixed network and operates in response to such detection to control the output of the ship's BTS. A problem with this approach is that detection of the fixed network's transmissions is often not a good indicator of the environment This is because a BTS will often increase or decrease the number of transmitted channels in response to factors such as network load. For example, scanning at one time may detect only a fixed BTS broadcast channel, whereas the BTS may soon after activate several additional channels.

The invention is directed towards achieving an improved system for avoidance of interference.

SUMMARY OF THE INVENTION

According to the invention, there is provided a radio interference avoidance system for a movable network on a vehicle comprising a vehicle position sensor, a database, and a processor, the processor transmitting control instructions to the movable network, wherein the database stores geographical data and radiation characteristics data for land-based fixed networks;

the processor dynamically determines radiation parameters for the movable network according to real time vehicle position data relative to fixed network geographical data and fixed network radiation characteristic data; and the processor generates said control instructions according to the radiation parameters.

In one embodiment, the database stores data concerning radiation characteristics of the movable network, and this data is used by the processor to determine the movable network radiation parameters.

In another embodiment, the processor retrieves said data from the movable network.

In a further embodiment, the movable network characteristic data includes data defining radiation patterns.

In one embodiment, the processor receives real time direction data of the vehicle, and computes current position of radiation pattern lobes relative to the fixed networks.

In another embodiment, said data includes movable network radiation effective radiated power.

In a further embodiment, said data includes protocol and frequency of the movable network radiation.

In one embodiment, said data includes movable network antenna height above sea level, and the processor computes movable network radiation propagation distance using said data.

In another embodiment, the database stores fixed network antenna height data, and the processor computes fixed network propagation distance using said data.

In a further embodiment, said data includes data concerning internal and external antennas of the movable network.

In one embodiment, the processor periodically queries the database with a current vehicle location value and a configurable trigger distance value, the database returns an identifier of any potentially interfering fixed networks, and the processor only proceeds with computation if such a fixed network identifier is returned.

In another embodiment, the database returns a data set for each identified fixed network.

In a further embodiment, said configurable trigger distance value is a worst case interference distance.

In one embodiment, the control instruction sent to the movable mobile network includes total shutdown/start-up, partial shutdown/start-up, frequency change, and/or power level changes.

In another embodiment, further comprises a local control terminal for manually inputting location or country information.

In a further embodiment, the processor uses information received from a local control terminal to override system operation.

In one embodiment, the processor executes a hysteresis function to avoid continual switching on and off of movable mobile network transmitters when navigating close to an interference distance.

In another embodiment, the processor receives updates for the database either from the local control terminal or remotely over a craft to ground communications link.

In a further embodiment, the processor is operated and maintained locally with instructions from the local control terminal, or remotely with instruction from a remote operations and maintenance system.

In one embodiment, the processor provides location data or other operational data to the movable network.

In another aspect, the invention provides a movable mobile network system comprising a radio interference avoidance system as described above, and a movable mobile network comprising a control interface for receiving control instructions from the radio interference avoidance system.

Detailed Description of the Invention

BRIEF DESCRIPTION OF THE DRAWINGS

The invention will be more clearly understood from the following description of some embodiments thereof, given by way of example only with reference to the accompanying drawings in which:—

DESCRIPTION OF THE EMBODIMENTS

Figure 1:
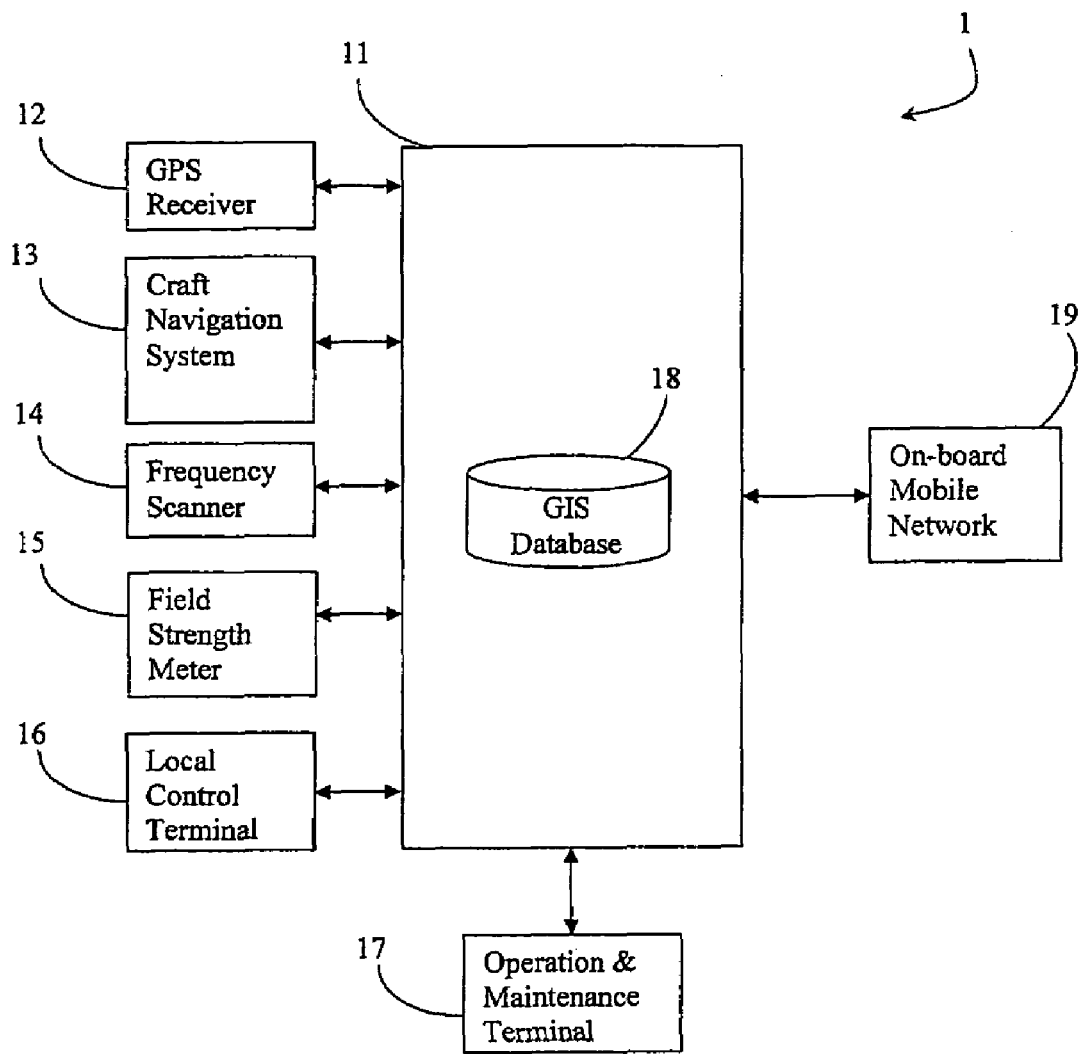
FIG. 1 is a schematic diagram of a radio interference avoidance system of the invention.

Referring to FIG. 1 a radio interference avoidance system 1 comprises:

11: A detection system having a processor and which communicates with a number of peripherals on one side and with an on-board mobile network 19 on the other side. The peripherals supply information needed by the detection system 11 to decide in real time what action, if any, is needed to be taken on the on-board mobile network 19. The system 11 includes a geographical information system (GIS) database 18 of action instructions and data.

12: A GPS receiver which supplies location information for the vessel to the detection system 11. This location information includes latitude, longitude, altitude, heading, speed, and time.

13: A craft navigation system which supplies craft location information to the detection system 11. This location information includes latitude, longitude, altitude, heading, speed, and time.

14: A frequency scanner which supplies information about frequencies and field strength being used in a particular spectrum by nearby fixed networks.

15: An RF field strength meter used to measure the actual field strength radiating from the ship's movable mobile network 19.

16: A local control terminal, used to input location and country information manually. It may also be used to set security parameters for the system and to override the detection system 11 in critical situations.

17: An operation and maintenance terminal for the system 1. This terminal may also be used to read and update the contents of the GIS database in textual or graphical format.

18: A geographic information system (GIS) database which generates data for use in controlling the on-board mobile network 19 in response to queries. The database 18 stores:
   (a) Geographical data for fixed networks,
   (b) Radiation characteristic data for these fixed networks, including frequencies, protocols, and antenna height.
   (c) Radiation characteristic data for the movable network 19, including the radiation pattern of lobes extending from the vehicle and their effective radiated power, and also protocol (for example, GSM) and frequency of transmissions. This data also includes antenna height above sea level.

It is not essential that the system 1 have all f the above components. For example it may not need a GPS received if the on-board navigation system supplies sufficient data.

The on-board mobile network 19 supports a control interface. This control interface enables the detection system 11 to manage the mobile network 19 in terms of its frequency use, power levels, and status (on/off). The system 11 can also receive configuration data form the on-board mobile network 19 relating to the power levels and frequencies currently being used. This interface is also used to provide location and other data to the on-board movable network.

The main goal of the system 1 is to allow the craft to come as close as possible to fixed networks without causing interference, or being interfered by or infringing on the international rights of a country's administration to protect its radio services.

The system 11 regularly receives inputs from some or all peripherals in real time, and it repeatedly queries the database 18. The output from the database 18 allows it to make decisions to control the network 19.

Location (latitude, longitude, altitude), speed and heading data are delivered to the system 11 either by the GPS receiver 12 or by the craft's navigation system 13 on a regular basis. The frequency at which this information is delivered is configurable and may be adaptive. For example, the system could normally check distance every 5 minutes but reduce this interval to 1 minute as the craft approaches a possible source of interference such as a land based network. A hysteresis function prevents continual switching on and off of the system for example when navigating along a country boundary. Location information may also be entered manually using the local control terminal 16 at any time.

The location information is used to build a query to the GIS database 18. The query includes the current location data and a distance value. This distance value is a trigger distance and is a configurable worst-case interference distance. The result of the query returns a list of zero or more countries whose international boundaries are within the trigger distance value of the current location. The database also returns a data set for each one of the countries in the list. This data set includes, but is not limited to:
   Name,
   Country type,
   Network type(s), and
   Frequency utilisation The country and network characteristic values are used by the detection system 11 to calculate at what distance from that fixed network action needs to be taken and what specific action is required. For example, in the case of an on-board network operating in the GSM1800 band, it may be necessary to shut down the on-board network completely within 30 km of a country also using GSM in the 1800 band, however, this figure could be reduced to 10 km for a country not using GSM in the 1800 band. Data from the database 18 can be complemented and/or replaced by information from the frequency scanner 14.

From the above it can be seen that there are two distance values being used. The first, called trigger distance, is used to query the GIS database 18 to discover the presence of any country within this distance of the craft. This trigger distance is configurable for the system and is usually set equal to the maximum interference distance. The second, called interference distance, is the distance at which action needs to be taken by the on-board mobile network 19.

The processor of the system 11 generates a radiation pattern for the ship based on the vehicle location data and the movable network characteristics. The system 11 uses this information to calculate an optimal interference distance. For example, if a ship is equipped with a directional antenna (say 60° half power beam-width and 20 dB front to back ratio) mounted at the stern, facing forward, then the critical distance will be less for a country behind the ship than for a country in front of the ship. The same logic can be applied to an aircraft with a known radiation pattern.

The movable network 19 may also include one or more internally mounted antennas, configured to cover the inside of the ship. These radiates less power outside the ship than an externally mounted antenna for a given transmit power level. The system 1 calculates different interference distances for the internal and external parts of the system. Also, the system 1 can selectively shut down the external part of the on-board mobile network 19, allowing continuing operation of the internal part until the interference distance corresponding to the internal part of the network has been reached.

The system 11, knowing the country type and network type, can adjust the frequencies and power levels used by the on-board mobile network 19 to optimise (minimise) the interference distance for that particular country.

In some cases it may be necessary to override the operation of the system 1 to ensure GSM coverage on the craft by the on-board network until coverage can be assured by the terrestrial network. This is necessary when coverage is required for security critical applications like container tracking. The system 1 override may be activated manually or may be configured to be automatically activated in certain locations or when the system is operating in security mode.

Updates for the GIS database 18 can be uploaded either from the local control terminal 16 or remotely over the craft-to-ground communications link. Utilities are available which allow the import of digital maps in various formats. In some cases it may be necessary to approximate the shape of a country's border to reduce the size of imported map files. A graphical user interface (GUI) for the visualisation and manual generation of digital maps is also incorporated in the system 11.

Operation of the system 1 is monitored remotely by examining log records of parameters used and system responses to these parameters. Any critical fault information (alarms) is sent immediately to the operations and maintenance centre and possibly also to a remote centre.

Figure 2:
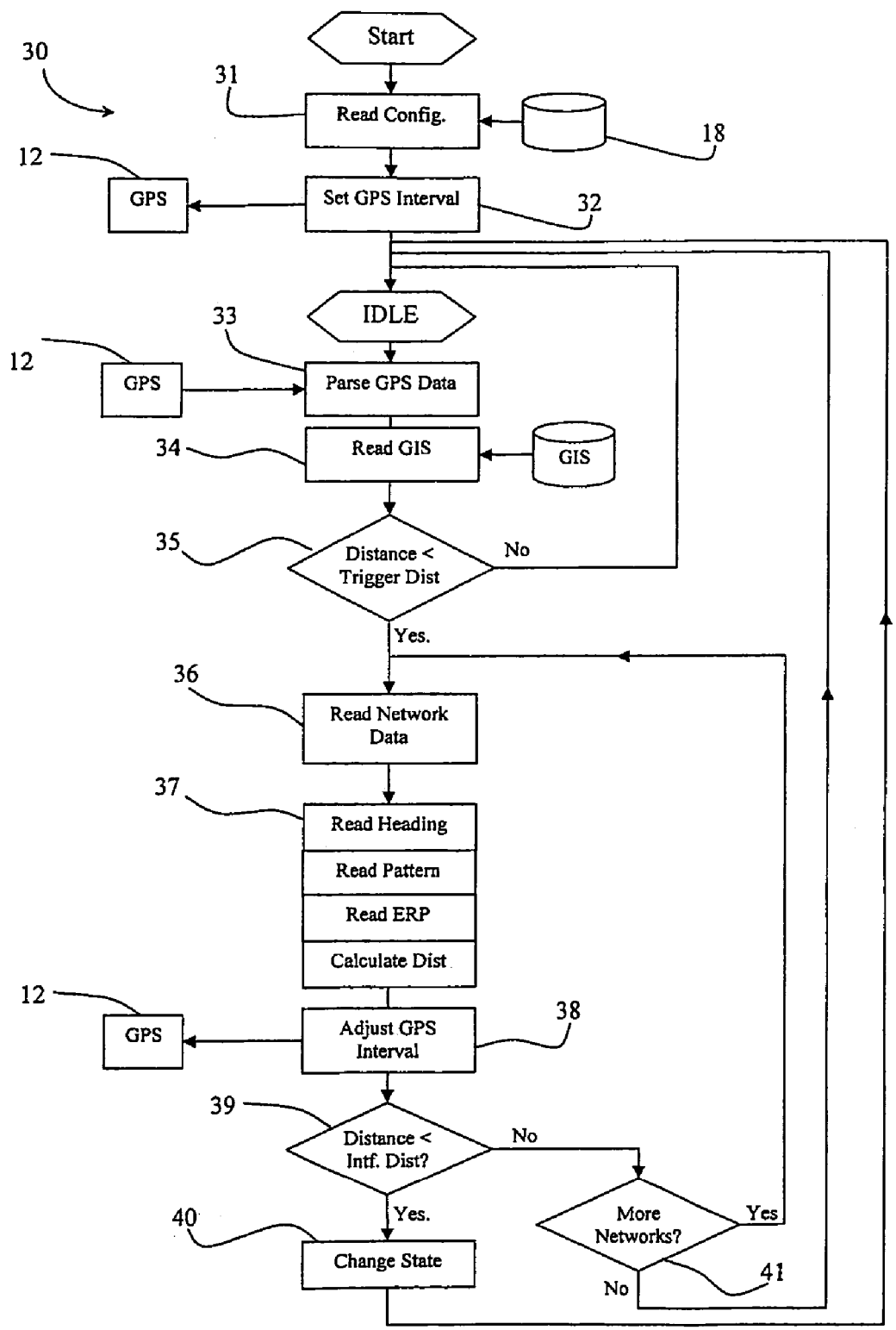
FIG. 2 is a flow diagram illustrating operation of the system.

In more detail, and referring also to FIG. 2, at system 1 start-up the detection system 11 (step 31) reads configuration data from the database 18. Configuration parameters are stored locally and the GPS receiver 12 is configured (step 32) to report position at regular intervals. The system 11 is set to Idle state.

Periodically, the GPS device 12 reports the vessel's position in terms of longitude, latitude and altitude. The information from the GPS device 12 is parsed (step 33) and a query string is generated that is used to interrogate the database 18 (step 34). The GIS database 18 returns a list of countries or networks that are within the specified trigger distance. If no countries are found (step 35) within the trigger distance, the system 11 returns to Idle state and waits for the next GPS report.

If one or more potentially interfering countries or networks are returned by the GIS database 18 then an Interference Distance must be calculated and checked for each country or network. To calculate the Interference Distance the processor takes into account the movable network 19 data and the following parameters in step 37:

The types of network used in the country which has been found within the trigger distance. Different network technologies require different separation levels, for example GSM to GSM co-channel requires at least 9 dB separation.

The on-board network 19 has an RF radiation pattern which depends on the antennas used and the shape and size of the ship. Different RF signal strengths are experienced at different directions relative to the heading of the ship. The Interference Distance from a particular terrestrial network therefore depends on the direction of that network relative to the ship's heading.

The Effective Radiated Power of the ship's system will affect the distance at which the ship's system interferes with the terrestrial system.

In some countries it is legislation and not interference distance that prevents the on-board system from being used within the territorial waters. In this case this legal distance is stored in the GIS database 18.

Using the parameters listed above, the processor calculates an interference distance for all parts of the on-board system. The distance may be different for antennas located inside the ship versus antennas located on the outside of the ship. If any of these distances is reached then that part of the network 19 is shut down. Other reactions to the interference distance being reached include turning down the power level and switching to a different frequency.

If an interfering fixed network is present within the trigger distance but not within any calculated interference distance the GPS device 12 may be reconfigured (step 38) to report at a different frequency which depends on the velocity of the ship. This allows the ship to come very close to the interference limit without actually crossing it.

When the ship moves out of the interference distance the on-board movable network can be restarted For restart of the on-board movable network, the procedure is essentially the same as described above with the exception that a dynamically calculated hysteresis is introduced. This is to prevent the system being repeatedly switched on and off when the ship is navigating parallel to a coastline.

It will be appreciated that the invention provides for optimal control of a movable mobile network to avoid interference.

The invention is not limited to the embodiments described but may be varied in construction and detail.

The invention claimed is:

1. A radio interference avoidance system for a movable network on a vehicle comprising a vehicle position sensor, a database, and a processor, the processor transmitting control instructions to the movable network, wherein the database stores geographical data and radiation characteristics data for land-based fixed networks;

wherein the processor dynamically determines radiation parameters for the movable network according to real time vehicle position data relative to fixed network geographical data and fixed network radiation characteristic data;

wherein the processor generates said control instructions according to the radiation parameters; and wherein the processor periodically queries the database with a current vehicle location value and a configurable trigger distance value; the database returns an identifier of any potentially interfering fixed networks, and the processor only proceeds with determining said radiation parameters for the mobile network if such a fixed network identifier is returned.

2. The system as claimed in claim 1, wherein the database stores data concerning radiation characteristics of the movable network, and this data is used by the processor to determine the movable network radiation parameters.

3. The system as claimed in claim 1, wherein the database stores data concerning radiation characteristics of the movable network, and this data is used by the processor to determine the movable network radiation parameters; and wherein the processor retrieves said data from the movable network.

4. The system as claimed in claim 1, wherein the database stores data concerning radiation characteristics of the movable network, and this data is used by the processor to determine the movable network radiation parameters; and wherein the movable network characteristic data includes data defining radiation patterns.

5. The system as claimed in claim 1, wherein the database stores data concerning radiation characteristics of the movable network, and this data is used by the processor to determine the movable network radiation parameters; and wherein the processor receives real time direction data of the vehicle, and computes current position of radiation pattern lobes relative to the fixed networks.

6. The system as claimed in claim 1, wherein the database stores data concerning radiation characteristics of the movable network, and this data is used by the processor to determine the movable network radiation parameters; and wherein the movable network characteristic data includes data defining radiation patterns; and wherein said data includes movable network radiation effective radiated power.

7. The system as claimed in claim 1, wherein the database stores data concerning radiation characteristics of the movable network, and this data is used by the processor to determine the movable network radiation parameters; and wherein the movable network characteristic data includes data defining radiation patterns; and wherein said data includes protocol and frequency of the movable network radiation.

8. The system as claimed in claim 1, wherein the database stores data concerning radiation characteristics of the movable network, and this data is used by the processor to determine the movable network radiation parameters; and wherein the movable network characteristic data includes data defining radiation patterns; and wherein said data includes movable network antenna height above sea level, and the processor computes movable network radiation propagation distance using said data.

9. The system as claimed in claim 1, wherein the database stores fixed network antenna height data, and the processor computes fixed network propagation distance using said data.

10. The system as claimed in claim 1, wherein the database stores data concerning radiation characteristics of the movable network, and this data is used by the processor to determine the movable network radiation parameters; and wherein the movable network characteristic data includes data defining radiation patterns; and wherein said data includes data concerning internal and external antennas of the movable network.

11. The system as claimed in claim 1, wherein the database returns a data set for each identified fixed network.

12. The system as claimed in claim 11, wherein said configurable trigger distance value is a worst case interference distance.

13. The system as claimed in claim 1, wherein the control instruction sent to the movable mobile network includes total shutdown/startup, partial shutdown/startup, frequency change, and/or power level changes.

14. The system as claimed in claim 1, further comprising a local control terminal for manually inputting location or country information.

15. The system as claimed in claim 1, wherein the processor uses information received from a local control terminal to override system operation.

16. The system as claimed in claim 1, wherein the processor executes a hysteresis function to avoid continual switching on and off of movable mobile network transmitters when navigating close to an interference distance.

17. The system as claimed in claim 1, wherein the processor uses information received from a local control terminal to override system operation; and wherein the processor receives updates for the database either from the local control terminal or remotely over a craft to ground communications link.

18. The system as claimed in claim 1, wherein said configurable trigger distance value is a worst case interference distance; and wherein the processor is operated and maintained locally with instructions from the local control terminal, or remotely with instruction from a remote operations and maintenance system.

19. The system as claimed in claim 1, wherein the processor provides location data or other operational data to the movable network.

20. A movable mobile network system comprising the radio interference avoidance system as claimed in claim 1, and a movable mobile network comprising a control interface for receiving control instructions from the radio interference avoidance system.

* * * * *